June 9, 1931. G. BETTANDORFF 1,808,758
POP CORN MACHINE
Filed July 7, 1928 3 Sheets-Sheet 1

INVENTOR.
GEORGE BETTANDORFF.
BY Harry C. Schroeder
ATTORNEY.

June 9, 1931. G. BETTANDORFF 1,808,758
POP CORN MACHINE
Filed July 7, 1928 3 Sheets-Sheet 2
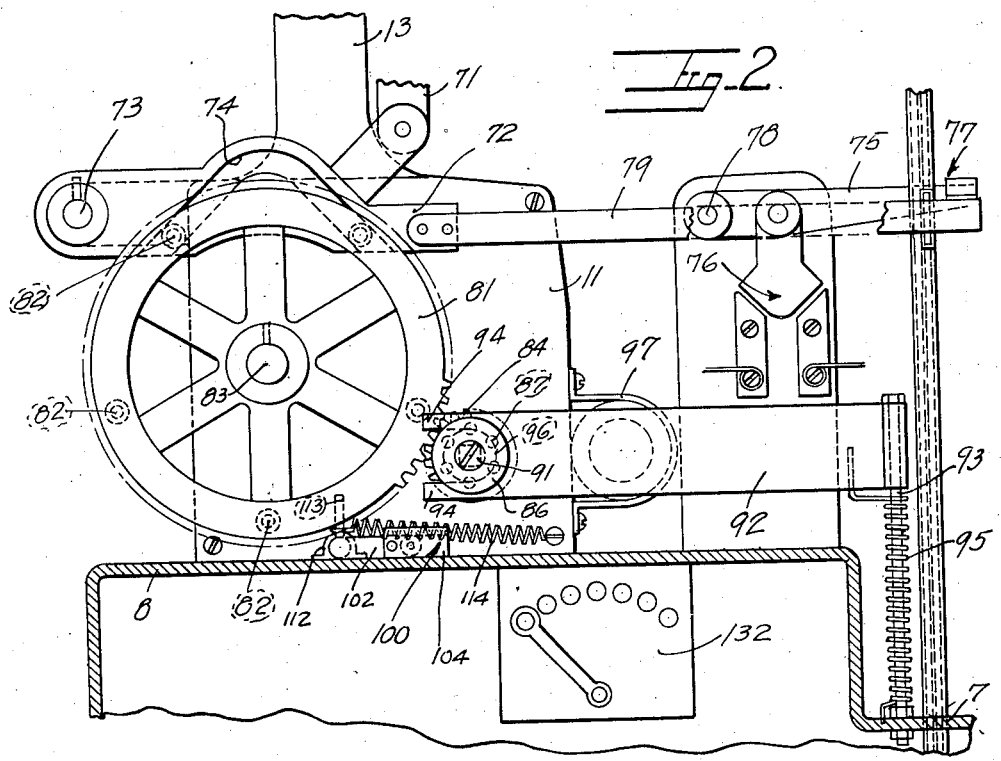
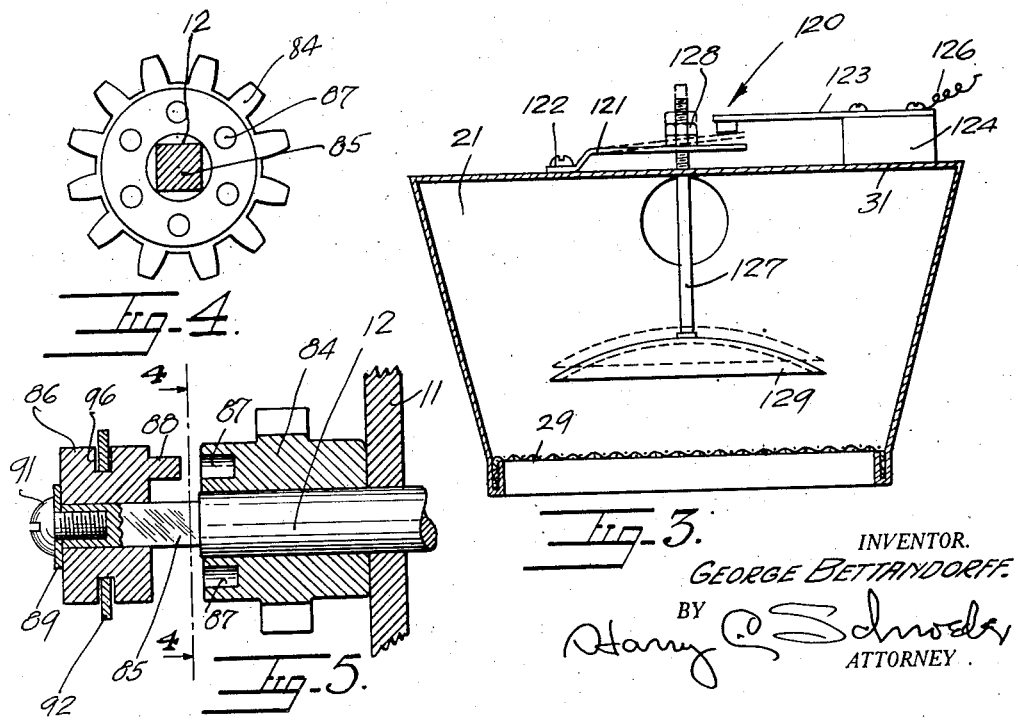
INVENTOR.
GEORGE BETTANDORFF.
BY Harry C. Schrods
ATTORNEY.

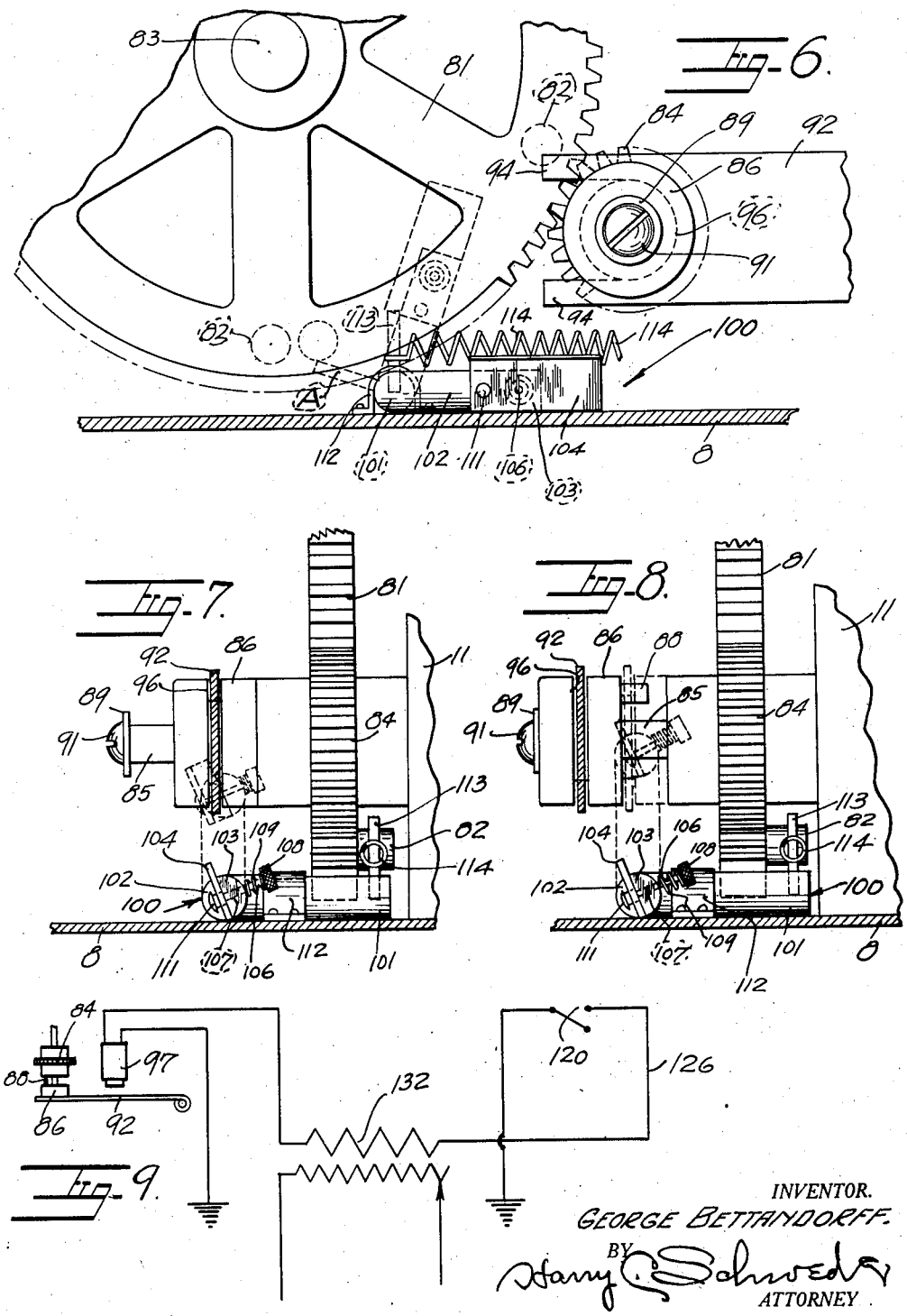

Patented June 9, 1931

1,808,758

UNITED STATES PATENT OFFICE

GEORGE BETTANDORFF, OF OAKLAND, CALIFORNIA, ASSIGNOR OF ONE-FOURTH TO HARRY C. SCHROEDER, OF CONCORD, CALIFORNIA

POP CORN MACHINE

Application filed July 7, 1928. Serial No. 291,098.

The invention forming the subject matter of this application relates to machines which, upon the deposit of a coin, are adapted to deliver goods of a certain kind to a customer, and it refers especially to a machine of the character which is adapted to vend popped corn, or other grain, to a customer. The invention refers particularly to an improvement on the ejecting mechanism of a machine of the character described in the co-pending application of Daniel W. Baker, Serial No. 192,518, filed May 19, 1927, for corn-popping machines.

The primary object of the invention is to provide an ejecting mechanism for a corn or grain-popping machine, which automatically ejects a predetermined quantity of corn or grain after the same is popped.

Another object of the invention is the provision of an ejecting mechanism for corn or grain-popping machine, which is actuated by the popped corn in the heated receptacle of the machine.

A still further object of the invention is the provision of an ejecting mechanism for corn-popping machines which remains idle until the corn or other grain is completely popped in the receptacle, and in which the accumulation of the popped corn or grain in a receptacle actuates an electrical circuit which, in turn, renders the ejecting mechanism active so that the same causes the tilting of the receptacle, containing the popped corn or other grain, thereby emptying said receptacle.

In this specification, and the annexed drawings, the invention is illustrated in the form considered to be the best, but it is to be understood that the invention is not limited to such form because it may be embodied in other forms; and it is also to be understood that in and by the claims, following the description, it is desired to cover the invention in whatsoever form it may be embodied.

In the drawings—

Figure 2 is an elevation of the coin-operated mechanism for starting the machine, and also shows the ejecting mechanism for tilting the grain receptacle in which the grain is heated;

Figure 3 is a sectional view of the grain receptacle in which the grain or corn is heated and popped, showing the circuit breaker for actuating the electric circuit of the ejecting mechanism;

Figure 4 is a view of the driving gear of the ejecting mechanism, the section being taken on the line 4—4 of Figure 5;

Figure 5 is a sectional view of the driving shaft, the driving gear thereon, and the clutch mechanism for engaging the driving shaft to the gear;

Figure 6 is a fragmentary view, showing the driving and the driven gears of the ejecting mechanism and also showing the driven gear operated releasing mechanism for disengaging the clutch from the driving gear;

Figure 7 is a fragmentary view partly in section of the ejection gearing and of the clutch releasing mechanism actuated thereby, showing the clutch in engagement with the driving gear of the ejecting mechanism;

Figure 8 is a fragmentary view of the mechanism, shown in Figure 7, showing the clutch disengaged from the gearing; and Figure 9 is a wiring diagram of the electric circuit of the ejecting mechanism for the pop corn machine.

Figure 1:
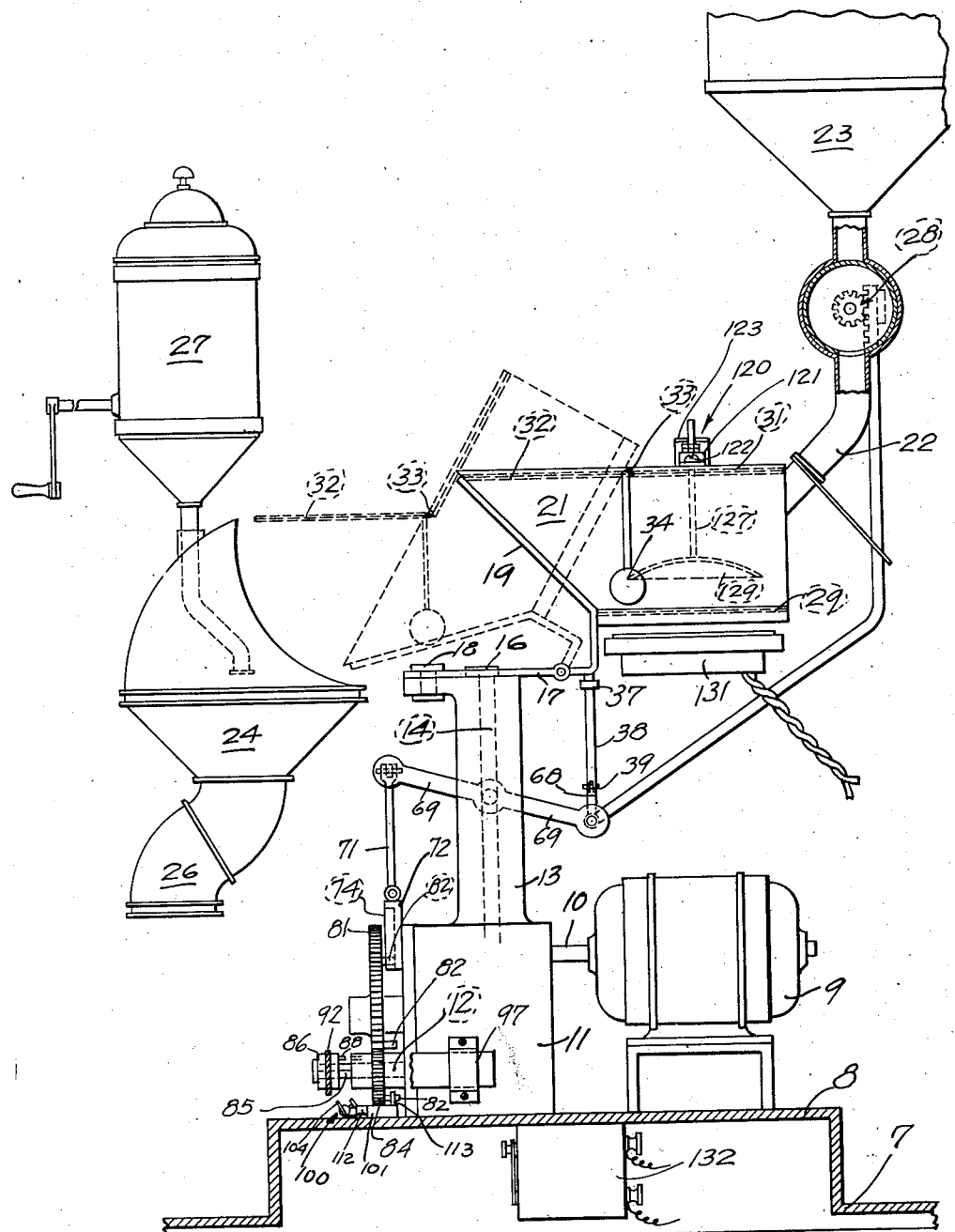
Figure 1 is a general somewhat diagrammatic elevation of some of the important parts of the popping machine, the outer casing being removed therefrom.

The automatic corn-popping machine is mounted in a suitable frame, which is provided with a base plate secured to the floor of the case, not shown. The base plate 7 has a platform 8 thereon, upon which is suitably mounted a motor 9 connected in circuit with an electric source, not shown, and provided with a shaft 10. The shaft 10 extends into a casing 11 in which is disposed a reduction gearing for rotating a shaft 12 at the desired rate of speed. From the casing 11 extends a standard 13. The transmission gearing in the casing 11 also rotates a vertical shaft 14, disposed in the standard 13, the shaft terminating in an eccentric cam 16. The cam 16 rotates in an arm 17, which is pivotally secured at one end thereof by means of a pivot 18 to the standard 13. The rotation of the shaft 14 and the eccentric rotation of the cam 16 oscillate the arm 17 in the manner described in said co-pending application. A bracket 19 has one end pivotally secured to the end of the arm 17, opposite to the pivotally point 18, so that the bracket 19 is thereby adapted to swing over the arm 17. The bracket 19 is preferably bent upwardly and has suitably secured thereto and supported thereon a receptacle 21 for such corn or other grain as is to be popped. At its top and opposite to the pivotal connection with the arm 16, the receptacle 21 is provided with a tube 22 which is adapted to convey the grain into the receptacle from a grain hopper 23.

On account of being secured to the bracket 19, the receptacle 21 is adapted to swing upon the pivot point of the bracket 19 for emptying the grain from the receptacle into a discharge hopper 24, connected with a delivery conduit 26. This discharge hopper may have associated therewith a device 27 of any suitable construction for mixing butter or other food elements with the discharged grain. A pinion and rack mechanism, denoted in its entirety by the numeral 28, is disposed between the tube 22 and the hopper 23 and is actuated simultaneously with the tilting of the receptacle 21 in the manner described in said co-pending application.

A screen 29 forms the bottom of the receptacle 21, while two plates 31 and 32 form the top thereof. The plate 31 is fixed, while the plate 32 is pivoted at 33 and is provided with a counterweight 34 so as to effect the opening of the conical end of the receptacle when the receptacle is tilted, as shown in dotted lines in Figure 1.

In order to swing the grain receptacle 21 from its normal position, the bracket 19 has thereon a downwardly extending stud which terminates in a universal joint 37, to which is connected the upper end of an arm 38 so that the arm is thereby adapted to follow the movement of the bracket 19. The other end of the arm 38 is pivotally secured, as at 39, to a projection 68 from an end of a lever 69, which projection is secured to the lever pivotally and in the manner clearly shown in Figure 8 of my co-pending application. The lever 69 is pivotally secured at an intermediate point thereof to the standard 13. From the other end of the lever depends an arm 71, pivotally secured thereto. A cam lever 72 is at one end rotatably mounted on a pivot 73 fixed to the casing 11. The cam lever 72 is provided on its side with a cam groove 74 for substantially the same purpose as disclosed in the said co-pending application. This groove presents a path which is in the general shape of an inverted V.

A circuit closing lever 75 actuates a switch, denoted in its entirety by the numeral 76, and is in turn actuated by a coin-controlled mechanism, denoted by the numeral 77. The switch and the coin-controlled mechanism function in the manner described in said co-pending application. An end of the circuit closing lever 75 is pivotally secured as at 78 to extensions 79 of the cam lever 72 and is lowered or raised by the movement of the extensions 79 and the cam lever 72. The structure and the operation of the device, as heretofore described, operates in the manner described in said co-pending application.

The subject matter of the present invention is mainly the improvement in the mechanism for raising the arm 71 or lowering the same in such a manner as to tilt the receptacle after the corn or grain in the receptacle is completely popped. The raising and lowering of the cam lever 72 is accomplished by means of a gear 81 having a plurality of projections 82 extending from one face thereof in co-acting relation with the cam groove 74 in the cam lever 72. The gear 81 is rotatably secured upon a shaft 83 which, in turn, is fixedly secured to the casing 11. The gear 81 is rotated by a driving gear 84 which normally idles upon the shaft 12. The driving shaft 12 has a reduced square end 85, upon which is slidable a clutch 86. The face of the gear 84 and the hub thereof, adjacent to the clutch 86, is provided with recesses 87, a plurality of recesses being provided at the same radial distance from the center of rotation of the gear, so as to facilitate the engagement of one of said recesses by a projection 88 protruding from the face of the clutch 86 adjacent to the gear 84. The outward movement of the clutch 86 is limited by means of a washer 89 held in place by a screw 91 threadedly secured into the square shaft end 85.

The clutch 86 is moved by means of an armature plate 92 rotatable around an end thereof on a bolt 93, which bolt, in turn, is fixedly secured upon the base plate 7. A torsion spring 95 is provided, one end thereof being fixedly secured to the base plate 7, and the other end thereof bearing against a face of the armature plate 92, so as to tend to force the armature 92 away from the casing 11. The end of the armature is bifurcated as at 94 and between the branches thereof is formed a bearing portion for rotatably engaging an annular groove 96 on the periphery of the clutch 86.

It is apparent that the action of the torsion spring 95 tends to turn the plate around its pivot 93 so as to move the clutch 86 outwardly toward the washer 89, thereby maintaining the clutch 86 normally out of engagement with the gear 84. The gear 84 is on the circular portion of the shaft 12. The clutch is continuously rotated by the square shaft end 85, but its lateral movement is prevented by the bifurcated end 94 of the armature 92, engaging the opposite shoulders of the groove 96 thereon.

An electro-magnet 97 is supported on the casing 11 in operative relation to the armature 92. When the electro-magnet 97 is energized, then it draws the armature 92 against the action of the torsion spring 94 so that the armature turned around its pivot 93 slides the clutch 86 upon the square shaft end 85 into engagement with the gear 84. Now, the gear 84, rotated by the clutch 86, will transmit the rotation to the gear 81, which will actuate the ejecting mechanism in a manner to be hereinafter described.

The projections 82 on the face of the gear 81 are equally spaced from each other, and they are so disposed that they are adapted to ride in the groove 74 of the cam lever 72. Now, it is apparent that when the gear 81 is rotated, then the projections traveling in the groove 74 first will force the lever 72 downwardly, thereby pulling the arm 71 and turning the lever 69, and also effecting the tilting of the receptacle 21 into the dotted line position shown in Figure 1. After the peak of the V-shaped slot 74 is reached, during the downward travel of the respective projections 82, the cam lever 72 is moved upwardly, thereby disconnecting the switch 76 in the manner described in said copending application, and at the same time actuating the arm 11, the lever 69, the arm 38, and the bracket 19, so as to return the receptacle 21 to its full line position, as shown in Fig. 1.

On the returning movement of the cam lever 72, which results in the aforesaid disconnection of the switch 76, the electro-magnet 97 will become de-energized. The tension of the spring 95 is not sufficient to overcome the friction between the projection 88 and the respective recess 87, but as the motor 9 will stop immediately when the switch 76 is disconnected, there is no further rotation transmitted to the gear 81 after the disconnection of said switch. The projections are so spaced on the face of the gear 81 that when the switch is disconnected and the motor stopped, two adjacent projections assume approximately the position shown in Figure 2 at the ends of the V-shaped cam groove 74.

In order to provide positive means for withdrawing the clutch 86 from the gear 84, I provide a clutch releasing mechanism, denoted in its entirety by the numeral 100 and clearly illustrated in Figures 6, 7, and 8. The clutch releasing mechanism comprises a cylindrical rod having a straight portion 101 and a bent portion 102 which is bent at right angles to the straight portion 101, an end of the bent portion being cut away so as to form a semi-cylindrical portion 103. The semi-cylindrical portion is so formed that the cut-away face thereof traverses the center plane of the cylindrical portion 102 at an angle less than 90 degrees to the plane of the platform 8. A plate 104 is secured upon the flat surface of the semi-cylindrical portion 103 so that the plate is inclined, pointing outwardly, toward the free face of the clutch member 86. The plate 104 is held in place against the flat surface of the semi-cylindrical portion 103 by means of a plunger 106 fixedly secured on the plate and slidable in a hole 107 extending thru the semi-cylindrical portion 103 at right angles to the plate 104. The plunger 106 has a head 108 thereon. A coil spring 109 is disposed around the plunger 106 between the head 108 and the semi-cylindrical portion 103, so as to force the head 108 away from the semi-cylindrical portion 103, thereby pressing the plate 104 against the flat surface of said semi-cylindrical portion.

In order to prevent the misalignment of the plate 104, a pin 111 is fixedly secured to the semi-cylindrical portion 103 and extends thru the plate 104, the plate being slidable thereon, and the head of said pin 111 being properly spaced from the outer face of the plate 104.

The straight portion 101 is rotatably supported in a bearing 112 and extends below the gear 81 as clearly shown in Figures 7 and 8. A pin 113 is fixedly secured into the straight portion 101 and protrudes over the face of the gear 81 in operative relation to the projections 82. A spring 114 is secured at one end thereof to the casing 11, the other end thereof being attached to the pin 113 so as to exert a pull thereon, thereby tending to turn the straight portion 101 so as to maintain the bent portion 102 in position upon the face of the platform 8, as shown in Figures 7 and 8.

The releasing mechanism 100 is actuated by the projections 82 in the manner clearly illustrated in Figure 6. When the gear 81 is rotated, a projection 82 abuts against the the pin 113 and moves the same toward the dotted line position, denoted by the character A in Figure 6, this movement being effected against the action of the spring 114. While the pin 113 is moved against the action of the spring 114, the straight portion 101 is rotated thereby in the bearing 112, thereby raising the bent portion 102 into the dotted line position shown in Figure 7. During the upward movement of the plate 104 with the bent portion 102, the upper inside edge of the plate 104 strikes the outside edge of the lower branch of the bifurcated armature end 94.

Viewing Figure 7, it is apparent that the position of the plate 104 results in the engagement of the inside upper edge of the plate 104 with the outside face of the armature end 94. In order to permit the passing of the plate 104 beyond the end 94, the plate 104 must move away from the flat face of the semi-cylindrical portion 103, which is accomplished by the action of the end 94 against the action of the spring 109. The dotted line position in Figure 7 shows the spring 109 in the compressed position. After the plate 104 cleared the lower branch of the armature end 94, the action of the spring 109 returns the plate 104 to its original position on the flat face of the semi-cylindrical portion 103.

Now, after the projection 82 passes the position shown in dotted line at A in Figure 6, it slides off the pin 113, thereby allowing the action of the spring 114 to return the pin 113 to its original position. During the return movement of the pin and the rotation of the straight portion 111, the plate 114 is returned therewith, but the lower edge of the plate 104 now falls inside of the lower branch of the bifurcated armature end 94 so that during the return movement of the plate 104, the same strikes the inside face of the armature end, thereby forcing the clutch 86 out of engagement with the gear 84. The impact of the plate 104 against the inside edge of the bifurcated armature end 94 causes the clutch 86 to slide to the end of the square shaft 85 against the washer 89, in which position it is maintained by the action of the coil spring 95. Thus the armature 92 is separated from the electro-magnet 97.

The releasing mechanism 100 is disposed in such relation to the gear 81 that the releasing of the armature 92 and the clutch 86 is accomplished before the motor 9 and the rotation of the gear 81 is completely stopped by the disconnection of the switch 76.

It is apparent that the ejecting mechanism for tilting the receptacle 21 is actuated at a time when the electro-magnet 97 is energized, and the receptacle is returned to its original position shortly before the clutch 86 is thrown out of engagement by the actuation of the releasing mechanism 100. In order to actuate the ejecting mechanism at a time when all the grain or corn in the receptacle is popped, the energizing of the electro-magnet 97 is accomplished at the proper time by a circuit breaker, denoted in its entirety by the numeral 120. The circuit breaker 120 comprises a resilient contact plate 121 secured to the top of the receptacle 21 by means of a screw 122, thru which the contact is also grounded. A fixed contact plate 123 is secured upon an insulating block 124 and is connected to the electro-magnet 96 by means of a conduit 126. A rod 127 is slidably secured into the resilient contact plate 121. The downward sliding thereof is limited by means of nuts 128 threadedly secured upon the threaded end of the rod 127 extending above the resilient contact plate 121. Upon the lower end of the rod 127 is fixedly secured a pan 129, the weight of which, in combination with the weight of the rod 127, pulls the plate 121 downwardly, thereby opening the electro-magnetic circuit.

In operation, grain or corn is fed into the receptacle 21 in the manner described in said co-pending application. During the popping of the corn, the bulk of the grain is increased and presses against the concave face of the pan, thus lifting the same and forcing the rod 127 to slide upwardly in the plate 121. As the plate 121 is resilient, it follows the upward movement of the rod 127. The length of the rod is so adjusted that when the grain or corn in the receptacle 21 is completely popped, by that time the rod 127 is lifted sufficiently high to allow the resilient plate 121 to assume the dotted line position shown in Figure 3, in which position the circuit of the electro-magnet is closed.

As it is described in my co-pending application, the switch 76 is closed when the proper coin is inserted in the coin-controlled mechanism 77. Therefore, at the time when the corn is completely popped and the circuit breaker 120 is closed, a current passes to the electro-magnet 97, which, in turn, attracts the armature 92, thereby engaging the clutch 86 with the gear 87, which, in turn, transmits the rotation of the shaft 12 and the clutch 86 to the gear 81. The gear 81 actuates the ejecting mechanism thru the projections 82 and the cam lever 72, moving the arm 71 and the lever 69, which, in turn, actuate the arm 38 and the bracket 19, thus tilting the receptacle into the dotted line position shown in Figure 1. The further rotation of the gear 81 returns the ejecting mechanism and the receptacle 21 to their original position. At the time when the receptacle is seated in its normal position, one of the projections 82 on the inside face of the gear 81 trips the pin 113. The releasing mechanism 100, when tripped, strikes the end 94 of the armature 92, thereby disengaging the clutch 86 from the gear 84. To operate the machine, another coin is inserted in the slot, closing the switch 76, starting the motor 9, which causes the vibration of the receptacle, and at the same time passing the current thru a heating element 131 which will cause the popping of the corn in the receptable 32.

The gear 81 is idle until the popped corn in the receptacle raises the pan 129, thereby closing the circuit breaker 120, whereupon the clutch 86 will be drawn into engagement with the gear 84 and will cause the action of the ejecting mechanism in the manner heretofore described. In the wiring diagram, in Figure 9, a transformer 132 is shown connected in the electro-magnetic circuit between the wire 126 and the electro-magnet 97 for the purpose of providing a current of proper voltage to the electro-magnet 97, the transformer 132 being connected in parallel with the switch 76.

It will be recognized that in my present device, the ejecting mechanism will not tilt the receptacle 21 until the grain therein is popped to the desired degree, thereby the disadvantage of the predetermined time operation of the ejecting mechanism is entirely obviated. It is a common occurrence in the use of ejecting mechanisms which operate at predetermined intervals that the grain is ejected from the receptacle before it is completely popped. In my invention, regardless of the quality of the grain and the time required for the popping of the grain, the ejecting mechanism always actuates at the proper time, thereby obviating the necessity of any adjustment to different types of grain. The ejecting mechanism is operated by the electric circuit used for the vibrating and heating elements of the popping machine, it being connected in parallel therewith. Therefore, a flow of electric current is assured any time after the coin-controlled switch 76 is closed.

I claim:

1. In a machine for popping corn or other grain, a motor and a heating element connected with a source of electric energy; a grain receptacle mounted so that the grain therein may be heated by the element when the receptacle is in its normal position, means connecting the receptacle with the motor for causing a tilting movement of the receptacle so as to eject the grain therefrom, and for swinging the receptacle back to its normal position after the ejection of the grain; and electro-responsive means adapted to be connected to a source of electric energy by the accumulated popped grain in the receptacle for rendering said connecting means active.

2. In a machine for popping corn or other grain, a motor and a heating element connected with a source of electric energy; a grain receptacle mounted so that the grain therein may be heated by the element when the receptacle is in its normal position; means connecting the receptacle with the motor for causing a tilting movement of the receptacle so as to eject the grain therefrom, and for swinging the receptacle back to its normal position after the ejection of the grain; electro-responsive means adapted to be connected to a source of electric energy by the accumulated popped grain in the receptacle for rendering said connecting means active; and means automatically disengaging said connecting means from the motor after the ejection is completed, said electro-responsive means being inoperative until acted upon by the accumulated popped grain.

3. In a machine for popping corn or other grain, a motor and a heating element connected with a source of electric energy; a grain receptacle mounted in operative relation to said heating element; means operated by the motor for tilting the receptacle so as to eject the grain therefrom and for swinging the receptacle back to its normal position after the ejection of the grain; electrically actuated means for operatively connecting the tilting means to the motor; a normally open circuit breaker controlling said connecting means, being connected to the source of electric energy, and being closed by the action of the popped grain accumulated in the receptacle; and means disengaging said connecting means when the circuit breaker is open.

4. In a machine for popping corn or other grain, a motor and a heating element connected with a source of electric energy; a grain receptacle mounted in operative relation to said heating element; means operated by the motor for tilting the receptacle so as to eject the grain therefrom, and for swinging the receptacle back to its normal position after the ejection of the grain; electro-responsive means for operatively connecting the tilting means to the motor; a normally open circuit breaker controlling said electro-responsive means; said circuit breaker comprising a stationary contact on the receptacle; a swingable contact in operative relation to the stationary contact; an element extending into said receptacle and holding the swingable contact in an inoperative position; said contacts being connected with a source of electric energy for operating said electro-responsive means; said element being so disposed as to be raised by the popped corn accumulated in the receptacle, thereby allowing the movement of the said swinging contact into contacting position so as to connect said electro-responsive means to the source of electric energy and to render the same active; and means disengaging said connecting means when the contacts of the circuit breaker are separated.

5. In a machine for popping corn or other grain, a motor and a heating element connected with a source of electric energy; a grain receptacle mounted in operative relation to said heating element; means for tilting the receptacle so as to eject the grain therefrom and for swinging the receptacle back to its normal position after the ejection of the grain; a rotary mechanism for actuating said tilting means; means for operatively connecting said rotary mechanism to the motor; an electro-magnet for moving said connecting means into engaging position; a circuit breaker connected with the source of electric energy, said circuit breaker being normally open, and being adapted to be closed by the popped grain accumulated in the receptacle, so as to energize said electro-magnet when a desired quantity of popped grain has accumulated in the receptacle; and means automatically disengaging said connecting means when the electro-magnet is de-energized.

6. In a machine for popping corn or other grain, a motor and a heating element connected with a source of electric energy; a grain receptacle mounted in operative relation to said heating element; means for tilting the receptacle so as to eject the grain therefrom and for swinging the receptacle back to its normal position after the ejection of the grain; a rotary mechanism for actuating said tilting means; means for operatively connecting said rotary mechanism to the motor; an electro-magnet for moving said connecting means into engaging position; a circuit breaker connected with the source of electric energy, said circuit breaker being normally open, and being adapted to be closed by the popped grain accumulated in the receptacle, so as to energize said electro-magnet when a desired quantity of popped grain has accumulated in the receptacle; and a tripping mechanism actuated by said rotating mechanism for disengaging said connecting means when the electro-magnet is de-energized.

7. In a machine for popping corn or other grain, a motor and a heating element connected with a source of electric energy; a grain popping receptacle mounted in operative relation to said heating element; means for tilting the receptacle so as to eject the grain therefrom and for swinging the receptacle back to its normal position after the ejection of the grain; a rotary mechanism for actuating said tilting means; a clutch for connecting said rotary mechanism to the motor; an electro-magnet; an armature co-acting therewith, the said clutch being moved into engaging position by the armature of said magnet when the magnet is energized; a circuit breaker connected with the source of electric energy for energizing said magnet, said circuit breaker being normally open and being adapted to be closed by the action of the popped grain accumulated in the receptacle; and means automatically moving said armature and said clutch in an inoperative position when said magnet is de-energized.

8. In a machine for popping corn or other grain, a motor and a heating element connected with a source of electric energy; a grain popping receptacle mounted in operative relation to said heating element; means for tilting the receptacle so as to eject the grain therefrom and for swinging the receptacle back to its normal position after the ejection of the grain; a rotary mechanism for actuating said tilting means; a clutch for connecting said rotary mechanism to the motor; an electro-magnet; an armature co-acting therewith, the said clutch being moved into engaging position by the armature of said magnet when the magnet is energized; a circuit breaker for controlling the electric energy to said electro-magnet; said circuit breaker comprising a stationary contact mounted on the receptacle; a swingable contact in co-acting relation to the stationary contact; an element depending from the swinging contact into the receptacle and normally separating said swinging contact from the stationary contact, said element being adapted to be raised by the popped corn accumulated in the receptacle so as to allow the movement of the swinging contact into contacting position, thereby energizing said electro-magnet; and a tripping mechanism actuated by the said rotary mechanism for disengaging said connecting means, when the electro-magnet is de-energized.

In testimony whereof I affix my signature.

GEORGE BETTANDORFF.